United States Patent
Qian et al.

(10) Patent No.: US 9,940,809 B2
(45) Date of Patent: Apr. 10, 2018

(54) SMART PHONE HAVING FUNCTION OF PREVENTING TO LEAVE CHILDREN IN CAR

(71) Applicants: Davy Zide Qian, Arcacia, CA (US); Benyu Qian, Shanghai (CN); Lequn Lu, Shanghai (CN)

(72) Inventors: Davy Zide Qian, Arcacia, CA (US); Benyu Qian, Shanghai (CN); Lequn Lu, Shanghai (CN)

( * ) Notice: Subject to any disclaimer, the term of this patent is extended or adjusted under 35 U.S.C. 154(b) by 0 days.

(21) Appl. No.: 15/350,398

(22) Filed: Nov. 14, 2016

(65) Prior Publication Data
US 2017/0140627 A1    May 18, 2017

Related U.S. Application Data

(60) Provisional application No. 62/255,425, filed on Nov. 14, 2015.

(51) Int. Cl.
| | | |
|---|---|---|
| G08B 21/02 | (2006.01) | |
| H04W 4/22 | (2009.01) | |
| B60Q 9/00 | (2006.01) | |
| G08B 21/22 | (2006.01) | |
| G08B 21/24 | (2006.01) | |

(52) U.S. Cl.
CPC .......... *G08B 21/0283* (2013.01); *B60Q 9/00* (2013.01); *G08B 21/22* (2013.01); *G08B 21/24* (2013.01); *H04W 4/22* (2013.01)

(58) Field of Classification Search
CPC ........ B60Q 9/00; G08B 21/0283; H04W 4/22
See application file for complete search history.

(56) References Cited

U.S. PATENT DOCUMENTS

| | | | | |
|---|---|---|---|---|
| 2005/0030188 A1* | 2/2005 | Flanagan | ........... | B60R 99/00 340/667 |
| 2009/0212955 A1* | 8/2009 | Schoenberg | ........... | B60N 2/002 340/573.1 |
| 2011/0025486 A1* | 2/2011 | Qian | ........... | B60Q 9/00 340/438 |
| 2012/0232749 A1* | 9/2012 | Schoenberg | ........... | B60N 2/002 701/36 |
| 2014/0184404 A1* | 7/2014 | Schoenberg | ........... | B60N 2/002 340/457 |
| 2015/0274036 A1* | 10/2015 | Arad | ........... | B60N 2/002 340/573.1 |

* cited by examiner

*Primary Examiner* — Sisay Yacob
(74) *Attorney, Agent, or Firm* — Global IP Services; Tianhua Gu

(57) ABSTRACT

A smart phone with application of preventing children from being left in a car includes a speedometer, a data processing center, a phone speaker, a micro phone, a touch screen and an application of preventing children from being left in a car (application). the application is programmed as the follows: the speedometer detects car speed and reports the car speed data to the application, when the car speed increasing from first speed to second speed the application issues a [REMINDER] of "if has children in the car" to a driver, when the car speed decreasing from third speed to 0 speed, the application issues a [WARNING] of "must bring children out of the car" to the driver.

7 Claims, 2 Drawing Sheets

SMART PHONE HAVING FUNCTION OF PREVENTING TO LEAVE CHILDREN IN CAR

CROSS REFERENCE TO RELATED PATENT APPLICATION

The present application claims the priorities of U.S. provisional applications No. 62/255,425 filed on Nov. 14, 2015, which application is incorporated herein by reference.

FIELD OF INVENTION

This invention belongs to an electronic communication field. More practically, this invention relates to an area of electronic alarm device.

BACKGROUND OF THE INVENTION

It is dangerous to leave children alone in a locked car, and especially in the summer or winter. That many children have died from heat stroke, hypothermia or suffocation in hot (or freezing) cars has caused tragedies in many families. Most of those tragedies were not caused intentionally by the acts of parents or drivers with children, but by their negligence and forgetfulness. Sometimes, a parent brought a kid out to shop, and the kid fell into a sleep in the car, the busy parent rushed to go to shopping since a lot of housework was waiting for him or her, and forgot the kid(s) who were sleeping in the cars. The parent locked the car, and as a result, caused a great misfortune, the kid suffocated and died in the extremely hot and locked car. The parent had to take legal responsibilities for the act that he or she caused. In some cases, those parents not only lost their kids, but also ruined their families.

People wish to have a driver alarm for preventing children from being left in the car. The driver's alarm should automatically remind the parent/driver about having kids inside the car when leaving the car; therefore, such tragedies can be avoided. Thus, the driver alarm for preventing children being locked inside of a car is very important.

Some of these kinds of inventions were made before; however no one is seen in the market. The Main reason is these inventions are complicated, and especially, too complicated to install; thus cannot be adopted by the public.

For those reasons, it is important to invent a method for preventing children being left in a car and a device thereof, which is simple to use and reliable.

SUMMARY OF THE INVENTION

A smart phone with application of preventing children from being left in a car comprising:
a smart phone having a speedometer, a data processing center, a phone speaker, a micro phone and a touch screen;
an application of preventing children from being left in a car (mentioned as application thereafter);
the speedometer detects the car speed and reports the speed data to the application, when the car speed increasing from first speed to second speed the application issues a [REMINDER] of "if has children in the car" to a driver, when the car speed decreasing from third speed to 0 speed, the application issues a [WARNING] of "must bring children out of the car" to the driver.

More particular, the application is programmed as follows:

step 1, the speedometer detects the car speed and reports the speed data to the application;
step 2, when the speed increasing from first speed to second speed, the application issues a [REMINDER] of "if has children in the car" to the data processing center;
step 3, after receiving the [REMINDER], the data processing center orders the speaker or touch screen to announce the [REMINDER];
step 4, the driver answers [YES] or [NO ANSWER] for the [REMINDER] from the microphone or touch screen to the data processing center, if [YES] then the program returns to step 1 and continues to process, if [NO] the program terminates work;
step 5, when the application discovers the speed decreasing from third speed to speed 0, the application issues a [WARNING] of "must bring children out of the car" to the data processing center;
step 6, the data processing center orders the speaker or touch screen to announce the [WARNING];
step 7, the driver answers [YES] for the WARNING, the application is terminated; [NO ANSWER] for the [WARNING], the [WARNING] is repeated until the driver answers [YES]; the driver answers [POSTPONE] to the [WARNING], the application returns to step 5, then continues to process;
step 8, after the [WARNING] being repeated for more than 20 times the smart phone transfers the [WARNING] to relatives of the driver or 911 police.

The smart phone with application of preventing children from being left in a car can be realized by using any smart phone downloaded with the application of preventing children from being left in a car. The price is cheap. Also, the usage is very convenient.

DETAIL DESCRIPTION OF PREFERRED EMBODIMENTS

Figure 1:
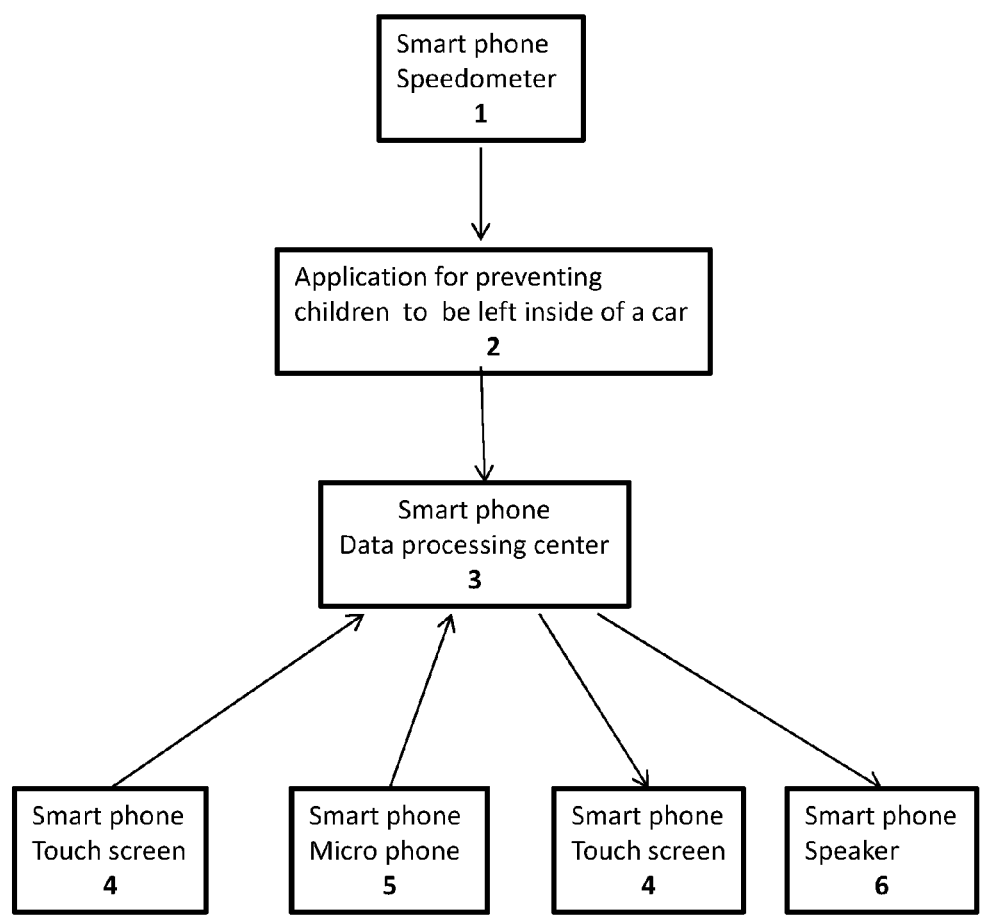
FIG. 1 is a sketch of structure of smart phone with application of preventing children from being left in a car

Refer to FIG. 1, the smart phone with application of preventing children from being left in a car is consisted by a common smart phone and an application of preventing children from being left in a car. The smart phone has a speedometer 1, data processing center 3, touch screen 4, micro phone 5, speaker 6 and application for preventing children from being left in a car 2. The touch screen 4 can show picture, also can be used as a key board for input data to the smart phone.

Figure 2:
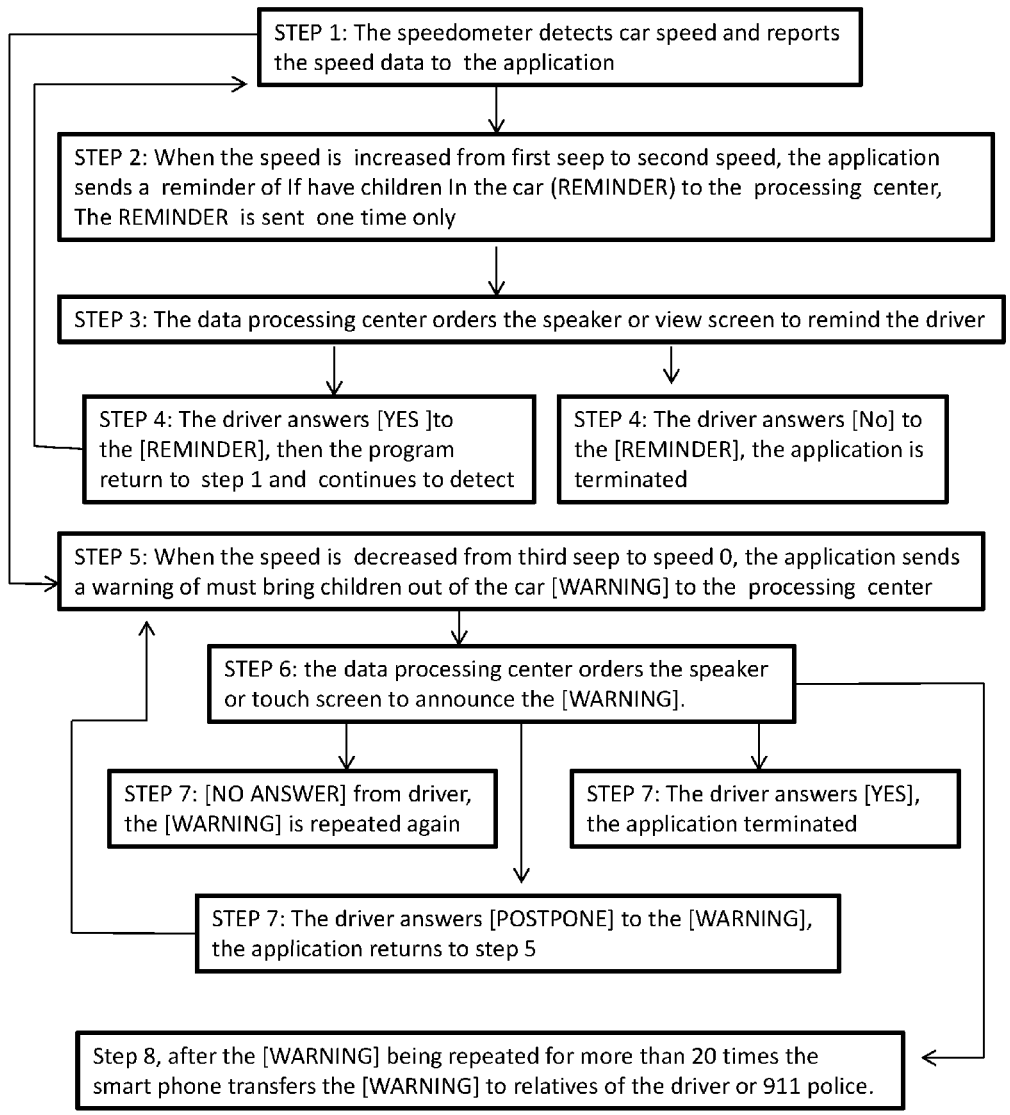
FIG. 2 is a working diagram of the application of preventing children from being left in a car

Refer to FIG. 2, the driver brings the smart phone with application of preventing children from being left in a car to drive the car, the application 2 is triggered to process:

Step 1, the speedometer detects the car speed and reports the speed data to the application 2.

Step 2, when the car speed is increased from first speed to second speed, the application 2 issues a [REMINDER] of "if has children in the car" to the data processing center 3, the [REMINDER] is sent one time only. The content of the [REMINDER] can be preset by the driver, the first speed and second speed can be preset by the driver. In an embodiment the first speed is 0 miles per hour, the second speed is >0 miles per hour. In other embodiment the first speed is 6 miles per hour, the second speed is 8 miles per hour.

Step 3, after receiving the [REMINDER], the data processing center 3 orders the speaker 6 or touch screen 4 to announce the [REMINDER]. The [REMINDER] can be announced in written language, verbal language, flash light, vibration or mixture thereof according to the setting by the driver.

Step 4, the driver answers [YES] or [NO ANSWER] for the [REMINDER] to the microphone 5 or touch screen 4, then the program returns to step 1 and continues to process. The driver answers [YES] for the [REMINDER], it means no children in the car. [NO ANSWER] for the [REMINDER], it means the driver does not hear the REMINDER. The driver answers [NO], the program is terminated, it means no children in the car.

Step 5, when the application 2 discovers the speed decreasing from third speed to speed 0, the application 2 issues a [WARNING] of "must bring children out of the car" to the data processing center 3. The third speed can be preset by the driver. In an embodiment the third speed is >0 miles per hour. In other embodiment the third speed is 5 miles per hour. The content of the [WARNING] can be preset by the driver. The speed decreasing from third speed to 0 speed that means the car is stopped by a red light or the car is arrived at a destination.

Step 6, the data processing center 3 orders the speaker 6 or touch screen 4 to announce the [WARNING]. The [WARNING] can be announced in written language, verbal language, flash light, vibration or mixture thereof according to the setting by the driver.

Step 7, the driver answers [YES] to the [WARNING], the application 2 is terminated; [NO ANSWER] for the [WARNING], the [WARNING] is repeated until the driver answers [YES]; the driver answers [POSTPONE] to the [WARNING], the application 2 returns to step 5, then continues to process. The driver answers [YES] to the [WARNING] that means the driver accepts the [WARNING] and will bring the children out the car. [NO ANSWER] for the [WARNING] that means the driver does not hear the [WARNING]. The driver answers [POSTPONE] that means the car is temporary stop, such as meeting a red light.

Step 8, [NO ANSWER] from the driver after the [WARNING] being repeated 20 times, the [WARNING] is automatically transferred to other smart phones of children's relatives by the smart phone; [NO ANSWER] from driver after the [WARNING] being repeated 40 times, the [WARNING] is automatically transferred to 911 police by the smart phone.

What is claimed is:

1. A smart phone with an application of preventing to leave children in a car comprising:
   a smart phone having a speedometer, a data processing center, a phone speaker, a microphone and a touch screen;
   an application of preventing children from being left in a car;
   the speedometer detects car speed and reports the car speed data to the application, when the car speed increasing from first speed to second speed the application issues a reminder of "if has children in the car" to a driver, when the car speed decreasing from third speed to 0 speed, the application issues a warning of "must bring children out of the car" to the driver.

2. The smart phone with an application of preventing to leave children in a car of claim 1, wherein the application is programmed as follows:
   step 1, the speedometer detects the car speed and reports the car speed data to the application;
   step 2, when the speed increasing from first speed to second speed, the application issues a reminder of "if has children in the car" to the data processing center;
   step 3, after receiving the reminder, the data processing center orders the speaker or touch screen to announce the reminder;
   step 4, the driver answers yes or no answer for the reminder to the microphone or touch screen, then the program returns to step 1 and continues to process; when the driver answers no, it means no children in the car, the program is terminated;
   step 5, when the application discovers the speed decreasing from third speed to 0 speed, the application issues a warning of must bring children out of the car to the data processing center;
   step 6, the data processing center orders the speaker or touch screen to announce the warning;
   step 7, the driver answers yes to the warning, the application is terminated; no answer for the warning, the warning is repeated until the driver answers yes; the driver answers postpone to the warning, the application returns to step 5, then continues to process.

3. The smart phone with an application of preventing to leave children in a car of claim 2, the first speed is 0 miles per hour, the second speed is greater than 0 miles per hour, the third speed is greater than 0 miles per hour.

4. The smart phone with an application of preventing to leave children in a car of claim 2, the first speed is 6 miles per hour, the second speed is 8 miles per hour, the third speed is 5 miles per hour.

5. The smart phone with an application of preventing to leave children in a car of claim 2, wherein the reminder or the warning is written language, verbal language, flash light, vibration or mixture thereof.

6. The smart phone with an application of preventing to leave children in a car of claim 2, wherein no answer from the driver after the warning being repeated 20 times, the warning is automatically transferred to other smart phones of children's relatives by the smart phone.

7. The smart phone with an application of preventing to leave children in a car of claim 2, wherein no answer from the driver after the warning being repeated 40 times, the warning is automatically transferred to 911.

* * * * *